United States Patent Office.

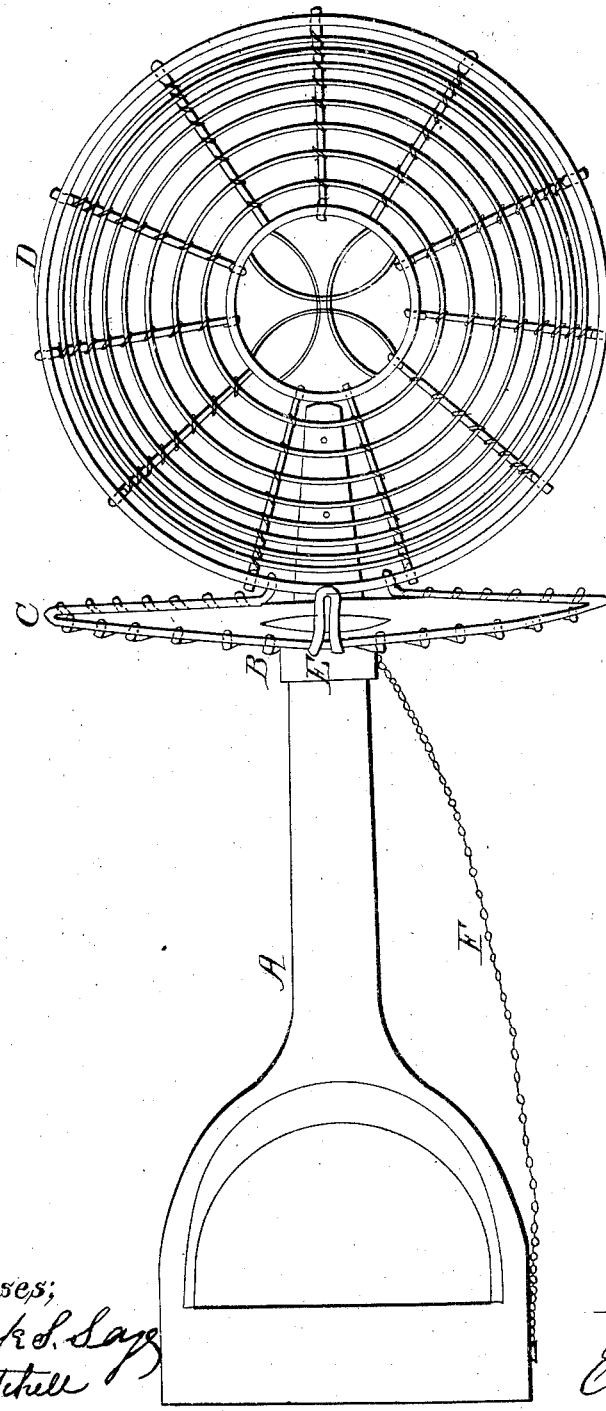

EZRA BIMM, OF DAYTON, OHIO.

Letters Patent No. 65,157, dated May 28, 1867.

IMPROVED BASKET FOR FEEDING TARRED CORN-COBS TO FURNACES.

*The Schedule referred to in these Letters Patent and making part of the same.*

TO ALL WHOM IT MAY CONCERN:

Be it known that I, EZRA BIMM, of Dayton, in the county of Montgomery, in the State of Ohio, have invented a new and improved Cob-Kindling Basket, used for handling cobs in the preparation of of Henry G. Dayton's patent artificial fuel, which is used chiefly as a kindling; and I do hereby declare that the following is a full and exact description thereof, reference being had to the accompanying drawing, and to the letters of reference marked thereon.

The nature of my invention consists in constructing a handled basket with lid, of suitable form to immerse corn-cobs while they are being saturated with H. G. Dayton's patent compound or any other preparation which may serve a similar purpose.

To enable others skilled in the art to make and use my invention, I will proceed to describe its construction and operation.

The figure represents a top view of the basket.

D represents a basket made of wire interwoven together, and having a capacity of from one to two bushels. To the side of this basket is riveted an iron socket, B, for the handle A, which is attached to it. On the side of the basket, directly over the handle, is attached the lid C, which is likewise made of wire interwoven together, similar to the basket. Opposite to the hinged connection with the basket the catch E is fastened to the lid, which serves to hold the lid shut. Near this catch the chain F is attached, the opposite end of which is attached to the handle, the use of which is to raise the lid while the cobs are being put into the basket. Perforated metal may be substituted for the wire in forming the basket.

The operation is effected thus: The lid is raised by the chain to save the hands from the heat and the composition; the cobs are then placed in the basket, and the lid is let down, closing the catch by its own weight; the basket, with its contents, is then immersed in the heated composition, which is prepared in a suitable vessel; the basket is then raised, giving a short time to drip, and then the basket is carried aside to empty the saturated cobs, which is done by inverting the basket, the weight being sufficient to spring the catch.

What I claim as my invention, and desire to secure by Letters Patent, is—

The cob-kindling basket, constructed substantially as herein described and for the purpose specified.

E. BIMM.

Witnesses:
 FREDERICK S. SAGE,
 THOS. D. MITCHELL.